W.m T. Fry,
Slate-Wiper.
No. 73,967.    Patented Feb. 4, 1868.
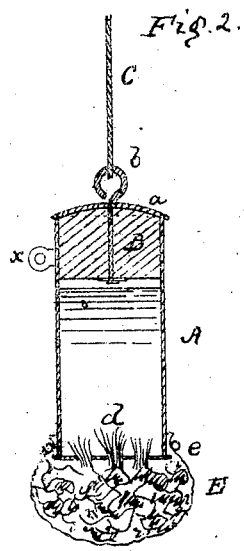
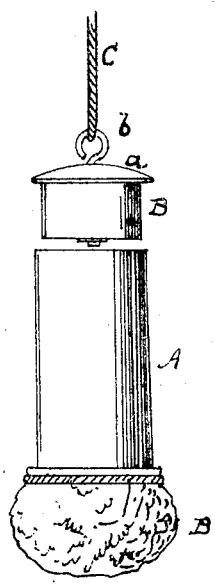
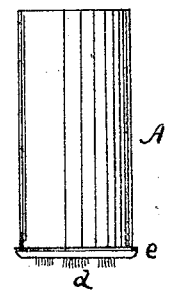
Witnesses: Wm Albert Steel, John Parker
Inventor: W. T. Fry
By his Atty H. Howson

United States Patent Office.

WILLIAM T. FRY, OF NEW YORK, N. Y., ASSIGNOR TO GEORGE H. JONES AND HENRY C. BERLIN, OF SAME PLACE.

Letters Patent No. 73,967, dated February 4, 1868; antedated January 23, 1868.

IMPROVEMENT IN WETTING OR WIPING-INSTRUMENTS FOR SLATES, &c.

The Schedule referred to in these Letters Patent and making part of the same.

TO ALL WHOM IT MAY CONCERN:

Be it known that I, WILLIAM T. FRY, of the city, county, and State of New York, have invented an Improved Wiping and Wetting-Instrument; and I do hereby declare the following to be a full, clear, and exact description of the same, reference being had to the accompanying drawing, and to the letters of reference marked thereon.

My invention consists of a vessel perforated at one end, where a sponge, or its equivalent is secured, the vessel to contain water, which is conveyed to the sponge by fibrous strands passing through the said perforated end, the sponge being thus supplied with sufficient water, without being overcharged, and the whole forming a suitable instrument to be attached to a school-slate, for wiping the same, as well as for wetting letter-copying books, and for other purposes.

In order to enable others to make and use my invention, I will now proceed to describe its construction and operation, reference being had to the accompanying drawing, which forms a part of this specification, and in which—

Figure 1 is an exterior view of my improved wiping and wetting-instrument.

Figure 2, a vertical section of the same.

Figure 3, a view of part of the instrument; and

Figure 4 a modification of the invention.

A is a vessel, which may be made of ordinary tinned plate or other suitable material, and to one end of which is fitted a cork or plug, B, secured to a plate, $a$, having an eye, $b$, to which is secured a cord or chain, C. The vessel A is closed at the opposite end, with the exception of one or more openings, through which pass strands $d$ of fibrous material, the latter being in contact with a sponge, E, which is secured to the lower end of the vessel, in the present instance, by wrapping a portion of the sponge to the same, and over a flange, $e$. The vessel A is filled or partly filled with water, and may be connected by the cord C to an ordinary school-slate. The water in the vessel is conducted by the fibrous strands $d$ to the sponge, which, without being overcharged with water, always remains in the moist condition necessary for an available slate-wiper, for wetting the pages of letter-copying books, for wiping pens, and for other purposes.

The sponge may be washed, from time to time, when charged with dust and dirt.

The vessel may be made of rubber, or other material, which will yield under pressure, and permit the water to be forced into the sponge, and for the latter may be substituted a mass of fibrous strands. In the modification shown in fig. 4, the vessel A is closed at the upper end, the lower end being screwed into a socket, between which and the open end of the vessel intervenes a suitable packing-washer. The fibrous strands, in this case, pass through perforations at the bottom of the socket.

I claim as my invention, and desire to secure by Letters Patent—

A vessel A, having openings in the end, through which pass fibrous strands $d$, in combination with a sponge E, with which the said strands are in contact, the whole being arranged substantially as specified.

In testimony whereof, I have signed my name to this specification in the presence of two subscribing witnesses.

WM. T. FRY.

Witnesses:
 THOMAS K. DODGE,
 DAVID L. DAVIS.